United States Patent [19]

Stephens

[11] Patent Number: 4,647,784
[45] Date of Patent: Mar. 3, 1987

[54] VEHICLE GUIDANCE AND CONTROL SYSTEM

[75] Inventor: Philip E. Stephens, Chelmsford, England

[73] Assignee: The General Electric Company plc, London, England

[21] Appl. No.: 608,242

[22] Filed: May 8, 1984

[30] Foreign Application Priority Data

May 14, 1983 [GB] United Kingdom ................ 8313339

[51] Int. Cl.⁴ ............................................. G01N 21/86
[52] U.S. Cl. ................................... 250/561; 250/566; 356/1; 901/47
[58] Field of Search ........................ 340/904, 905, 988; 250/566, 202, 234, 235, 236, 561; 180/167, 168, 169; 901/47; 356/1

[56] References Cited

U.S. PATENT DOCUMENTS

| | | | |
|---|---|---|---|
| 4,307,791 | 12/1981 | De Bruine | 180/168 |
| 4,328,422 | 5/1982 | Loomer | 250/202 |
| 4,482,960 | 11/1984 | Pryor | 250/202 |
| 4,531,061 | 7/1985 | Rabinow | 250/566 |

Primary Examiner—Davis L. Willis
Assistant Examiner—James G. Gatto
Attorney, Agent, or Firm—Spencer & Frank

[57] ABSTRACT

A vehicle guidance and control system has a number of trucks whose movement is controlled by a base station. Each truck periodically fixes its own position in relation to marker boards consisting of patterns of reflective coded stripes by scanning a narrow laser beam in a predetermined direction across the stripes. Using at least two boards its position can be determined by triangulation, and because the beam scans in a fixed direction, the positional accuracy can be determined by a particular stripe or edge of a stripe, and not by the size of a marker board as a whole.

11 Claims, 5 Drawing Figures

VEHICLE GUIDANCE AND CONTROL SYSTEM

BACKGROUND OF THE INVENTION

This invention relates to a vehicle control and guidance system in which one or more vehicles each having its own motive power and steering capability can be accurately moved within a predetermined area of space.

In the present case, the vehicles are of a free ranging nature and the invention seeks to provide a system in which the vehicles can be guided over paths which are not of a predetermined nature but with a very high degree of positional accuracy.

SUMMARY OF THE INVENTION

According to a first aspect of this invention a vehicle guidance and control system includes a vehicle having motive power and steering and means for transmitting a directional laser beam which is scanned in a predetermined sense; a plurality of reflectors spaced apart from each other, each incorporating an optical code which identifies that reflector, and which is located so as to be capable of intercepting said laser beam; and means utilising light reflected back to said vehicle by at least two reflectors for controlling the movement and heading of said vehicle.

According to a second aspect of this invention a vehicle guidance and control system includes a plurality of controllable vehicles each having individually controllable motive power and steering and having means for transmitting a directional laser beam which is continuously scanned in azimuth in the same sense; a base station for allocating destinations for the vehicles; a plurality of reflectors spaced apart from each other, each incorporating an optical code which identifies that reflector, and which is located so as to be capable of intercepting said continuously scanning laser beam; and means utilising light reflected back to said vehicle by at least two reflectors for controlling the movement and heading of said vehicles towards their respective destinations.

Thus the laser beam can be scanned continuously in a clockwise or anticlockwise direction.

Preferably the nature of each reflector, and the disposition of the means which serve to identify it, are dependent on the sense of the azimuth direction in which the laser beam is scanned, i.e. clockwise or anticlockwise.

Preferably again the reflector comprises an array of stripes disposed transversely to the direction of the scanning, with the stripes having predetermined reflection characteristics which differ from their background or a second interleaved array of stripes. In this way the stripes constitute an optical pattern representing a binary code which uniquely identifies the reflector and distinguishes it from all other of said reflectors. Preferably, at least one of the stripes defines a precisely determined position in said system, and the instant at which light is reflected by it back to the vehicle is utilised by the vehicle to determine its own angular position relative to that of the stripe.

The directional laser beam could be one which is extremely narrow in the azimuth direction, or fan-shaped in elevation, so that the beam will strike each reflector even if they are mounted at different heights, and if the platform on which the scanning laser beam is mounted is not always exactly horizontal.

Alternatively, a narrow pencil laser could be projected in an exactly horizontal direction if all reflectors are carefully placed at the correct height - this results in a more efficient use of the available laser light.

The means for transmitting the directional laser beam preferably comprises an arrangement for directing a pencil-like beam upwards upon an inclined mirror which is rotatable about a nominally vertical axis. Conveniently, a lens is positioned just below the mirror surface so as to convert the pencil-like beam into a fan-shaped beam if required before it is incident upon the mirror.

BRIEF DESCRIPTION OF THE DRAWING

The invention is further described by way of example with reference to the accompanying drawings in which.

DESCRIPTION OF THE PREFERRED EMBODIMENTS

Figure 1:
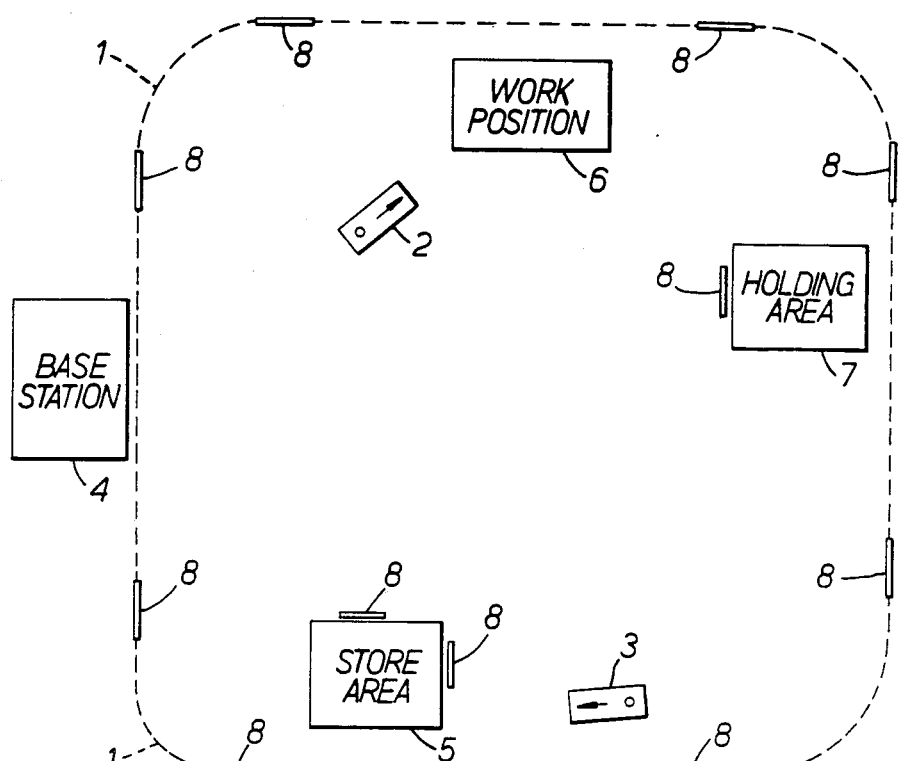
FIG. 1 is a schematic plan view of a vehicle guidance and control system in accordance with the invention.

Referring to FIG. 1 there is shown in schematic form an area defined by a perimeter shown in broken line 1 within which two mobile trucks 2 and 3 are to be controlled and guided under the overall control of a base station 4. In practice, the trucks 2 and 3 are utilised to transfer material between a store area 5 and a work position 6. The store area can, for example, accommodate raw material which is to be machined at the work position into a required shape, or otherwise processed in accordance with a particular requirement. The finished work pieces are transferred by means of one of the trucks to a further holding area 7 for removal and utilisation as required.

The base station 4 allocates required destinations to each of the trucks 2 and 3 via any convenient form of communication link. For example, a short range radio communications link can be provided, or, alternatively, an optical communication system utilising infra-red transmitters and detectors mounted in the ceilings of the area defined by the perimeter 1. In this latter case each vehicle contains a co-operating infra-red sensor and transmitter directed upward. Once each vehicle has been allocated a particular destination it navigates autonomously utilising transmitted instructions and relying on reflector boards 8 located around the area of movement to achieve a high degree of positional accuracy. Each reflector board contains a unique code which indicates its identity and precise position. The reflector boards are described in greater detail subsequently with reference to FIG. 3.

Each vehicle contains a scanning laser beam which rotates in azimuth so that it scans across each of those reflector boards which are within its field of view. The reflector board is composed of a retro-reflective material which is such that a narrow beam is reflected in the same direction from which the original illumination is incident upon it. Thus each vehicle is able to determine the precise direction of at least two reflector boards relative to its own position, and using triangulation techniques the vehicle is therefore able to determine its own position relative to any location within the perimeter 1, such as the store area 5, the work position 6 and the holding area 7.

The vehicle continuously monitors its own position as it moves along a path which takes it to its required destination. Its own position is continuously transmitted back to the base station so that the base station is aware of the location of all trucks to enable it to assume overall command to avoid a collision between two trucks. Particularly precise control is required in the region of the store area 5, the work position 6 and the holding area 7 and for this reason additional reflectors are positioned around these locations as indicated in FIG. 1. In practice, the store area and the holding area may be much larger than illustrated, and of complex configurations. For example, each may consist of a large number of bays divided into separate sections by means of alleyways down which the trucks can navigate. In this case additional reflector boards are required so as to ensure a truck is always able to communicate with at least two of them whilst in any position.

Figure 2:
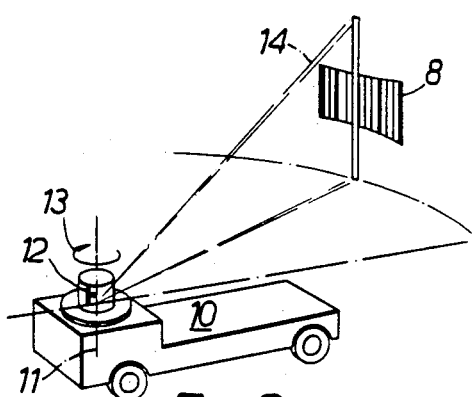
FIG. 2 shows a vehicle.

A truck is illustrated diagramatically in FIG. 2, and it will be seen that it comprises a small vehicle having a load carrying surface 10 and a raised portion 11 at one end which supports a rotating scanner head 12. As the scanner head rotates in azimuth a very narrow fan-shaped laser beam 14 is transmitted, although it may be desired to use just a narrow horizontal pencil-like beam. The fan beam has an appreciable vertical spread which is determined by the apex angle of the fan so as to ensure that at least a portion of the laser beam 14 is incident upon a reflector board 8 regardless of significant variations in the height of the reflector board above ground level. It will be seen that the reflector board 8 contains an array of the vertically disposed stripes referred to previously. Assuming that the laser beam is rotating in a clockwise direction, or sense, as indicated by the arrow 13, the beam sweeps across the board 8 shown in FIG. 2 from left to right. The reflector board 8 therefore returns an amplitude modulated beam of light having a pattern which varies in time which corresponds to the bright (reflective) and dark (absorbing) portions of the reflector board. The returned signal is received by a detector located within the scanning head, and from this information the vehicle can determine its precise bearing relative to that of the reflector board 8 and by utilising returns from two or more boards it can make minor corrections to its path to compensate for any positional errors.

Figure 3:
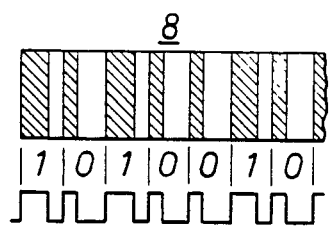
FIG. 3 shows a reflector.

A reflector board is illustrated in greater detail in FIG. 3. It will be seen that it contains reflective stripes, which are indicated by cross-hatching, which are spaced apart by dark stripes, i.e. non-reflective regions. The width of the reflective stripes and the associated non-reflective stripes together determine the nature of the coded signal which is obtained. Thus in FIG. 3 a digital "1" is represented by a relatively wide reflective stripe followed by a narrower non-reflective stripe, and a digital "0" is represented by the inverse combination of these stripes.

Assuming still that the reflector board 8 is scanned from left to right in this example, the first few stripes serve to indicate unambiguously that a reflector board has been found. It is important to distinguish a reflector board from other reflective bodies within the field of view which could produce a confusingly similar reflector pattern, such as a metal grid or mesh having a number of vertically disposed wires. Once the initial pattern of 1's and 0's has been found which identify a reflector board, a unique code follows, identifying that particular reflector board so as to distinguish it from all other reflector boards which are mounted within the area. The final vertical stripe in this example is a position stripe which indicates the position of the end of the reflector board with a very high degree of accuracy, typically to within one cm, although any predetermined stripe could be designated as the position member. As a stripe could have an appreciable width, in a system requiring very high positional accuracy, the boundary edge of the stripe will be used to define the position of the reflector board. Thus, the angular bearing of the vehicle can be determined relative to that of the reflector board at the instant that the rotating scanning head receives a reflected signal from the end stripe.

Along a corridor, conveniently two reflector boards can be associated with a particular reflector position such that each can be easily seen by trucks approaching in either direction. In this case the stripes at the abutting ends of the two boards serve to define a common position relative to which the truck orientates itself.

An accurately calibrated optical encoder keeps track of the angular position of the rotating scanner head 12 relative to that of the vehicle. An angular bearing of this kind received from at least two reflector boards enables the absolute position of the vehicle to be determined accurately. The angular offset of the vehicle from the reflector boards indicate its actual headings and can be used to permit navigation of the vehicle to proceed to a required destination.

Figure 4:
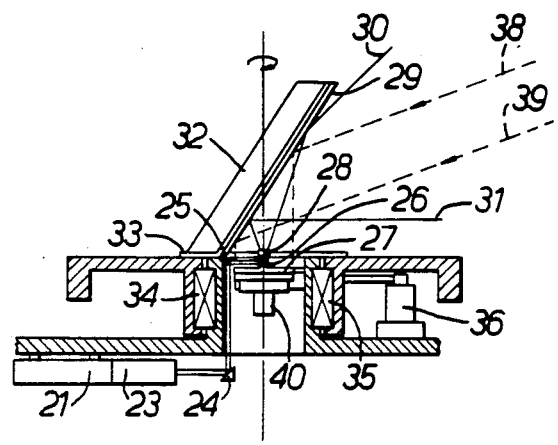
FIG. 4 shows part of a vehicle-mounted laser beam scanning head.

The nature of the scanning head 12 is illustrated in greater detail of the sectional view of FIG. 4. Referring to this drawing, a laser 21 generates a very narrow beam of intense coherent light which is expanded by means of an optical system 23 into a parallel sided pencil-like beam of about 5 mm width. This laser may be a conventional gas-filled type consisting of a mixture of helium or neon, or it may be a semi-conductor source such as a gallium arsenide laser diode. The narrow pencil beam is emitted by the optical system 23 and is reflected at a mirror 24 upwardly on to a further mirror 25 which is fixed relative to the vehicle. The beam is then reflected on to a further small mirror 26 which is carried by the centre of a plate, the remaining annular region of which constitutes a very large area light sensor 27. The transmitted beam is passed via a cylindrical lens 28 on to the reflecting surface of an inclined mirror 29. The lens in combination with the mirror produce a very wide angle fan beam defined by the lines 30 and 31. The fan typically has an apex angle of about 40°. The mirror 29 has a flat planar surface and is supported by a rotating frame 32 which is secured to a base diode 33 supported by bearings 34 and 35 and which are driven by means of a small motor 36 so that the mirror 29, and hence the laser beam, are rotated in azimuth at a rate of about three revolutions per second.

Light reflected by a reflector board is returned in a parallel beam, represented by the lines 38 and 39, which is incident upon the inclined mirror surface 29 and directed downwardly on to the very large area of the light sensor 27. The use of retroreflective stripes on the target boards ensures that a very high proportion of the incident light is returned to the sensor 27, as retroreflective material returns incident illumination back along its original path largely independently of the angle of incidence. Typically, the sensor 27 comprises a photo diode. An interference filter can be placed immediately above the sensor 27 to reduce the effect of ambient light.

The information is extracted in electrical form via an interface device 40 and fed to an analysing circuit for utilisation as required.

If the gallium arsenide diode laser is used to produce the beam, the light output can conveniently be pulsed at a high predetermined frequency, typically above 1 MHz, and the use of a band pass filter tuned to the same frequency in the output path of the sensor 27 provides positive discrimination against interference by ambient light. By modulating the beam in an amplitude pulsed manner, a direct indication of the distance of a truck from a reflector board can be obtained. One could simply measure the transit time of a pulse reflected back to the sensor, but preferably the phase of the modulated reflection is compared with that of the emitted beam.

Figure 5:
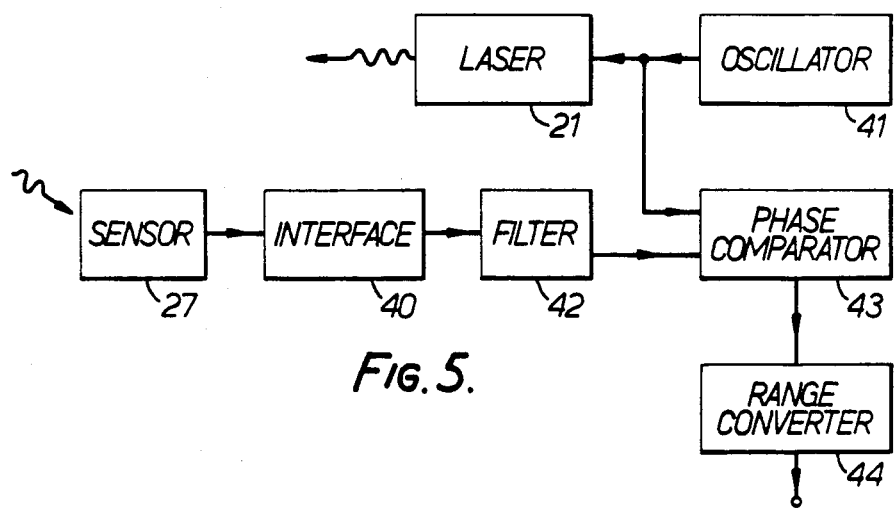
FIG. 5 shows circuits associated therewith.

An arrangement of this kind is indicated diagramatically in FIG. 5, in which an oscillator 41 running at about 100 MHz is used to drive the gallium arsenide diode laser 21 so as to amplitude modulate it. The output from the sensor 27 is fed via the interface device 40 to a narrow band pass filter 42 tuned to the frequency of oscillator 41. The filtered signal is fed to a phase comparator 43 where it is compared with the output of the oscillator. The phase difference (or phase shift) is directly related to the distance of the truck from the reflector board, and is converted into a measure of distance at a converter 44. Since the approximate position of the truck is known by monitoring its movement from a location at which it can access two reflector boards, use of a single reflector board need only give a fine adjustment of position, and hence the use of a very high optical frequency modulation having a short effective wavelength, will not result in ambiguity in the calculated position of the truck.

I claim:

1. A vehicle guidance and control system including a vehicle having motive power and steering and means for transmitting a directional laser beam which is scanned in a predetermined sense; a plurality of reflectors spaced apart from each other, each reflector incorporating an optical code which identifies that reflector, and each reflector being located to intercept said laser beam; and means utilizing light reflected back to said vehicle by at least two reflectors for controlling the movement and heading of the said vehicle.

2. A vehicle guidance and control system including a plurality of controllable vehicles each having individually controllable motive power and steering and having means for transmitting a directional laser beam which is continuously scanned in azimuth in a predetermined sense which is the same for the laser beams of all of said vehicles; a base station for allocating destinations for the vehicles; a plurality of reflectors spaced apart from each other, each incorporating an optical code which identifies that reflector, and which is located so as to be capable of intercepting said continuously scanning laser beam of each said vehicle; and means utilizing light reflected back to each said vehicle by at least two reflectors for controlling the movement and heading of said vehicles towards their respective destinations.

3. A system as claimed in claim 2 and wherein the nature of each reflector, and the disposition of the means which serve to identify it, are dependent on the sense of the azimuth direction in which the laser beam of each said vehicle is scanned.

4. A system as claimed in claim 2 and wherein the reflector comprises an array of stripes disposed transversely to the sense of the scanning of said laser beams, said stripes being separated from one another, in the sense of the scanning of the laser beams, by background regions, with the stripes having predetermined reflections characteristics which differ from the reflection characteristics of the background regions.

5. A system as claimed in claim 4 and wherein at least one of the stripes defines a precisely determined position in said system, and the instant at which light is reflected by said at least one stripe back to the vehicle is utilised by the vehicle to determine the angular position of the vehicle relative to the at least one stripe.

6. A system as claimed in claim 2 and wherein means for transmitting a directional laser beam comprises an arrangement for directing a narrow beam vertically upon an inclined mirrow which is rotatable about a nominally vertical axis.

7. A system as claimed in claim 2 and wherein the transmitted laser beam is modulated so as to permit direct determination of the distance of the reflector which returns a reflection.

8. A system as claimed in claim 7 and wherein means are provided for determining the phase of the reflection with respect to the transmitted beam, so as to generate an indication of the distance.

9. A system as claimed in claim 3 and wherein the reflector comprises an array of stripes disposed transversely to the sense of the scanning of said laser beams, said stripes being separated from one another, in the sense of the scanning of the laser beams, by background regions, with the stripes having predetermined reflection characteristics which differ from the reflection characteristics of the background regions.

10. A system as claimed in claim 9 and wherein at least one of the stripes defines a precisely determined position in said system, and the instant at which light is reflected by said at least one stripe back to the vehicle is utilised by the vehicle to determine the angular position of the vehicle relative to the at least one stripe.

11. A vehicle guidance and control system including a vehicle having motive power and being arranged to navigate freely within a predetermined area and means for transmitting a directional laser beam which is scanned in a predetermined sense; a plurality of reflections spaced apart from each other, each reflector incorporating an optical code which identifies that reflector, and each reflector being located to intercept said laser beam; and means utilising light reflected back to said vehicle by at least two reflectors for controlling the movement of the said vehicle within said area.

* * * * *